United States Patent [19]
Vogel

[11] 3,979,149
[45] Sept. 7, 1976

[54] VEHICLE SEAT
[75] Inventor: Heiner Vogel, Karlsruhe, Germany
[73] Assignee: Ignaz Vogel GmbH und Co. KG, Karlsruhe, Germany
[22] Filed: Aug. 20, 1974
[21] Appl. No.: 498,933

[30] Foreign Application Priority Data
Aug. 20, 1973 Germany............................ 2341981

[52] U.S. Cl................................ 297/232; 297/303;
297/416; 297/440
[51] Int. Cl.²....................................... A47C 15/00
[58] Field of Search ........... 297/232, 303, 302, 412,
297/416, 411, 440, 160–162, 257, 118, 248,
250; 248/412; 85/75

[56] References Cited
UNITED STATES PATENTS
1,209,452  12/1916  Kirsch.................................. 297/257

| 1,276,708 | 8/1918 | Bair .......................................... 85/75 |
| 2,815,067 | 12/1957 | Richardson..................... 297/416 X |
| 3,261,640 | 7/1966 | Straits............................. 297/440 X |
| 3,351,377 | 11/1967 | Anderson............................ 297/162 |
| 3,592,505 | 7/1971 | Paine .................................. 297/232 |

Primary Examiner—James T. McCall
Attorney, Agent, or Firm—Walter Becker

[57] ABSTRACT

A vehicle seat in which a support frame is provided beneath the seat with the support frame including a laterally extending torsion member which is preferably in the form of a noncircular tube, such as a rectangular tube. A seat is disposed with the center of gravity above the torsion member and is connected to the torsion member, preferably, at points spaced therealong from the points of connection of the torsion member to the support frame.

4 Claims, 12 Drawing Figures

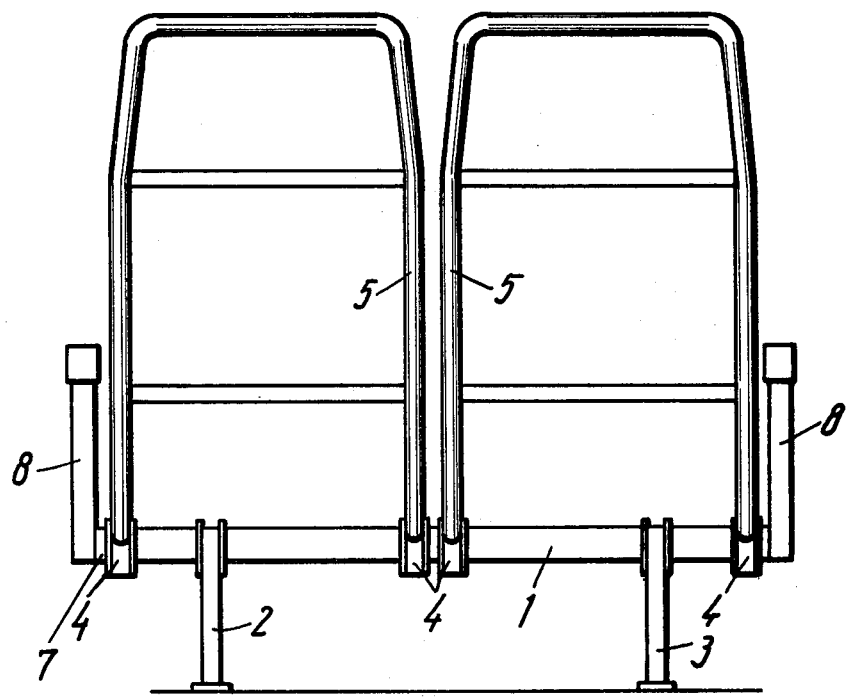
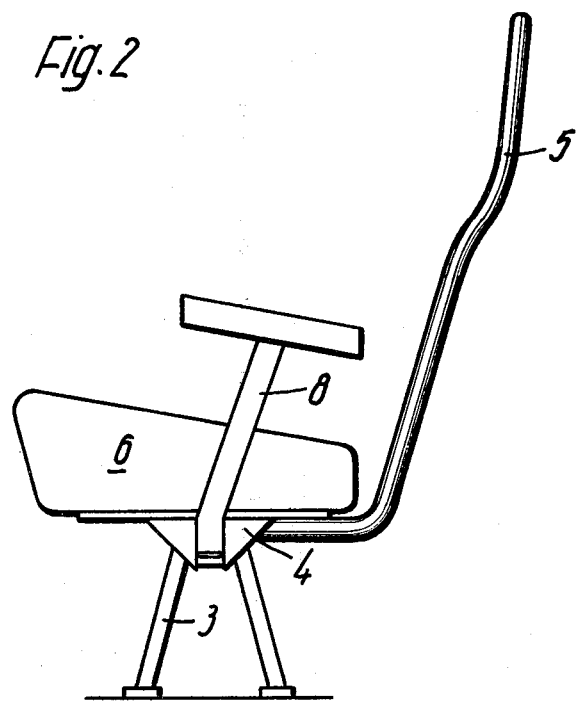

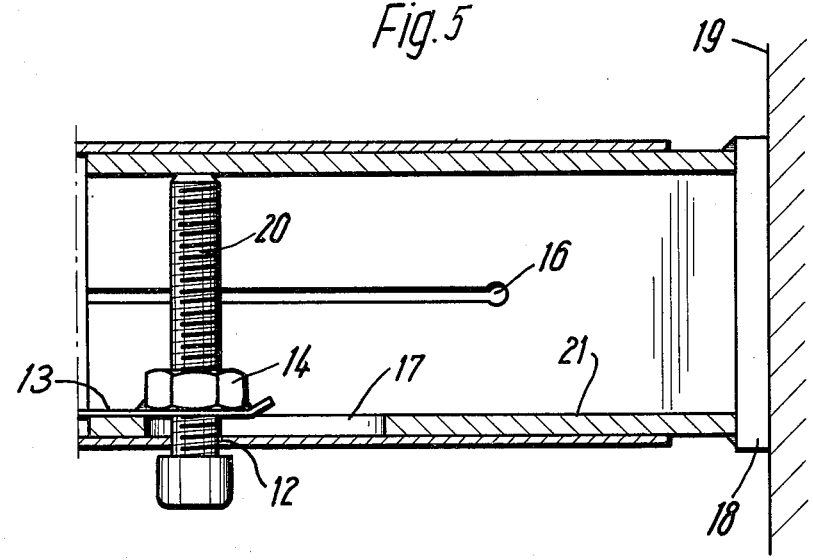
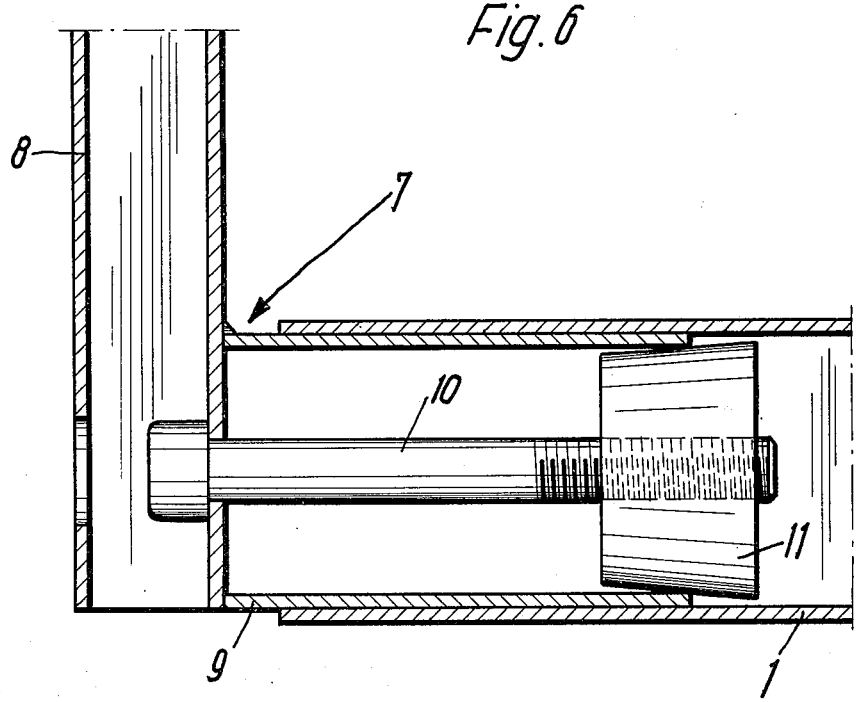

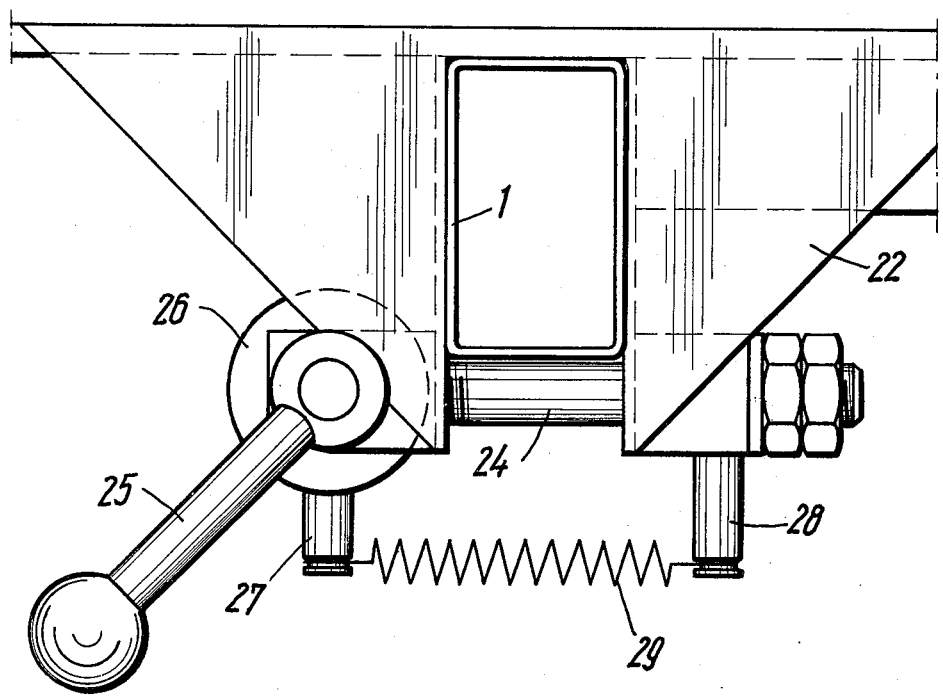

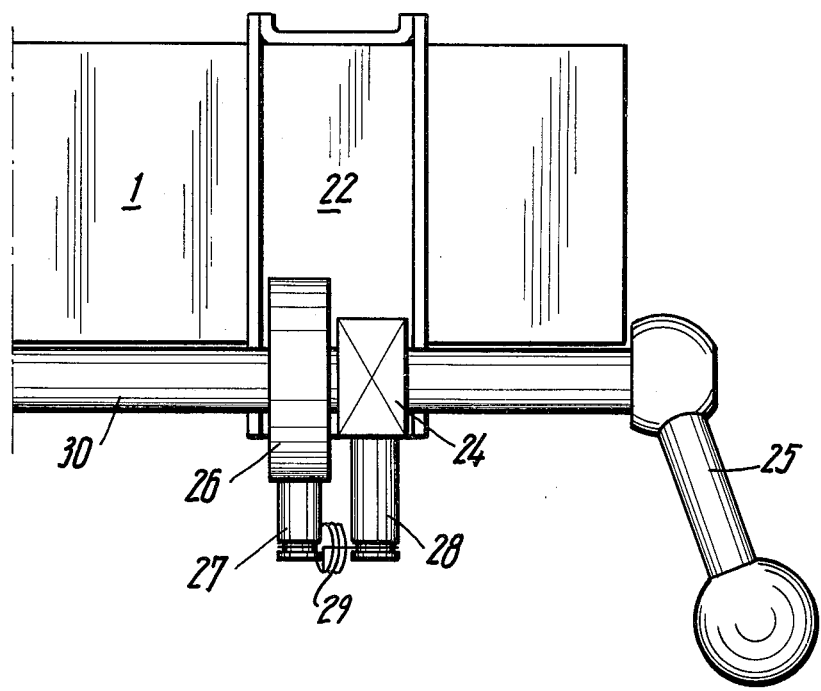

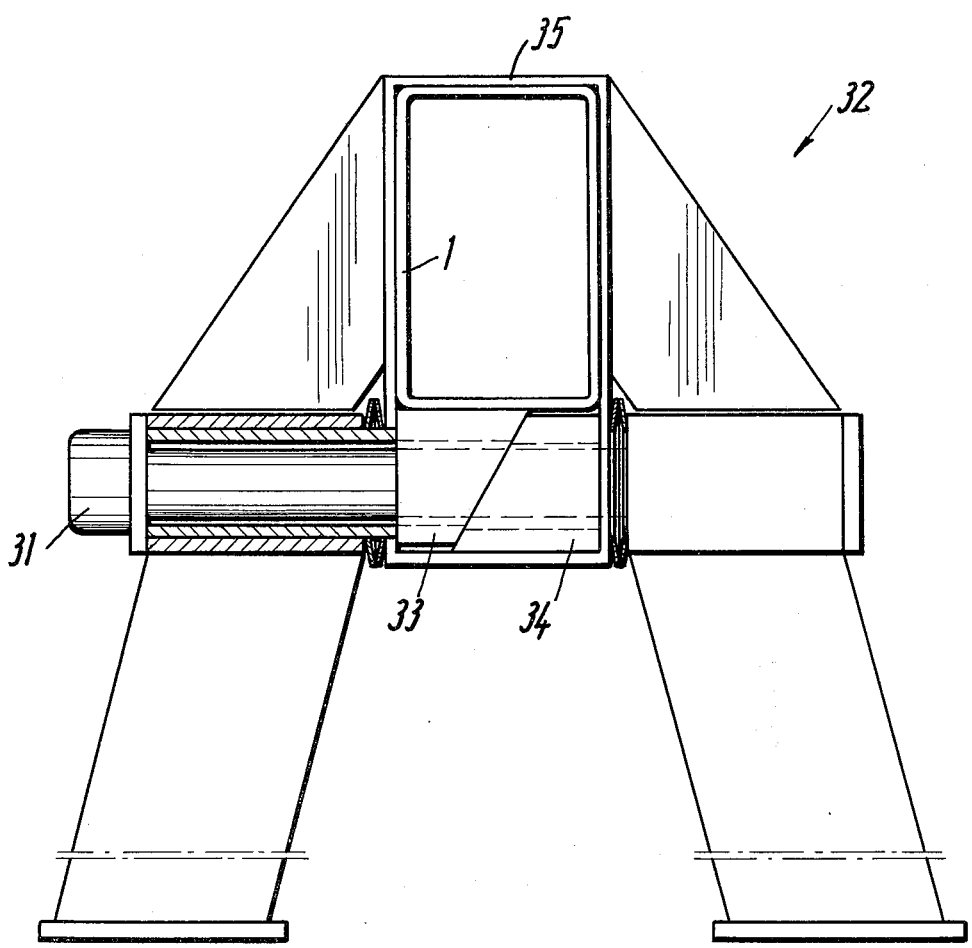

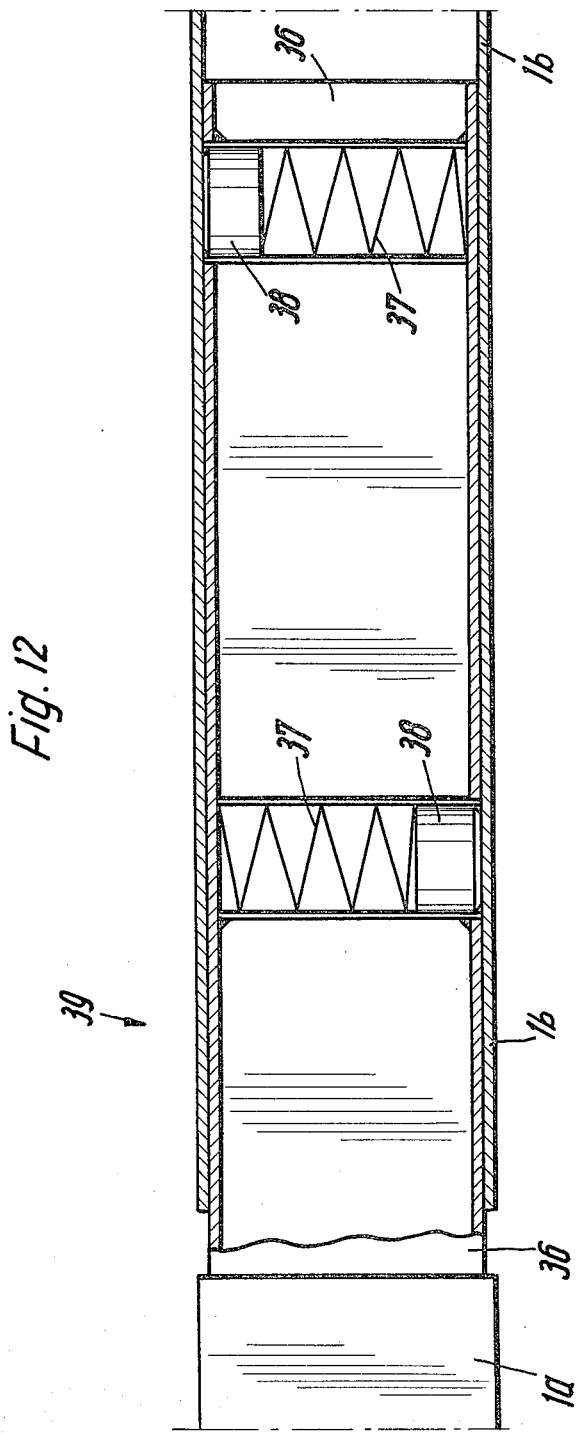

VEHICLE SEAT

The present invention relates to a vehicle seat construction which comprises a supporting frame to be connected to the vehicle, and the seat or seats to be mounted on said supporting frame.

Numerous seat constructions for vehicles have become known, the purpose of which consists on one hand in giving the passenger as much comfort as possible, and on the other hand to simplify the manufacture of such seats as well as their assembly and mounting. Fundamentally, a difference is made between a so-called line chair system (Linienbestuhlung) and a so-called comfort chair system (Komfortbestuhlung), a chair system for commerical buses, etc., according to which the seats have reclineable backs and if desired also have variable seat surfaces.

With the line chair system, ruggedness of the seat construction is of foremost importance as well as great space saving. Seats of this type are usually of a simple construction and in extreme cases consist of benches placed on simple supports. The seats for commercial buses, etc., the so-called sleeper seats, however, are considerably more expensive inasmuch as all structural elements for the adjustment of the reclineable back, of the arm rests and if necessary also the seat surface have to be provided for within the seat construction while nevertheless sufficient leg space has to be left particularly for the persons behind such seat. As a rule, it is also necessary when a plurality of seats are arranged adjacent to each other with one seat adjacent the aisle, to be able to retract or adjust the seat at the aisle so that after all passengers have taken their seats the space between the seats can be somewhat increased.

Between these two extremes, namely line chair system and comfort chair system, there exist, of course, numerous solutions for instance for ferries, which as a rule have sufficient space so that the close line construction is not necessary. Such seat constructions, however, also have to offer a certain comfort even though they are used in line service (Liniendienst). In such an instance, there is as a rule no chair construction with sleeping seats necessary, which also applies to rail vehicles in the more comfortable compartments. The different design possibilities of such vehicle seats present high requirements to the manufacturer because frequently completely different constructions are utilized. These requirements affect not only the expenses for the construction but also the stock keeping for different vehicle seat elements as well as the assembly of such seats and the servicing thereof. It is, therefore, an object of this invention to simplify these different vehicle constructions, their mounting and servicing without foregoing the comfort seats.

It is another object of this invention to be able to exchange vehicle seats of the comfort group among each other, in other words for instance a comfort seat with fixed back with a comfort seat with a reclineable back, or the selective provision of arm rests, etc.

These and other objects and advantages of the invention will appear more clearly from the following specification in connection with the accompanying drawings, in which:

FIG. 1 is a view of a vehicle seat construction according to the invention.

FIG. 2 shows a side view of the seat construction of FIG. 1.

FIG. 5 shows the end sleeve in assembled condition.

FIG. 6 is a different end sleeve construction.

FIG. 9 illustrates a view of the clamp according to FIGS. 7 and 8 with an eccentric lever.

FIG. 10 illustrates a side view of the clamp according to FIGS. 7 and 8 with an eccentric lever.

FIG. 11 is a pivotal support.

FIG. 12 is a profile tube-telescope connection.

Figure 3:
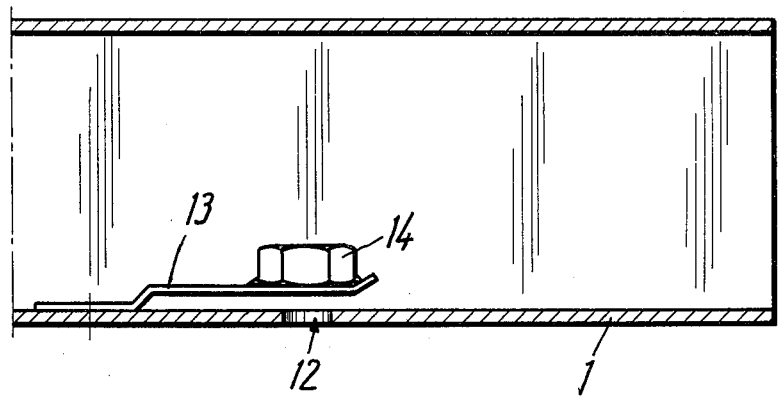
FIGS. 3 and 4 illustrate individual elements of an end sleeve.

The vehicle seat construction according to the present invention which comprises a supporting frame to be connected to the vehicle and also includes a vehicle seat to be mounted on said supporting frame is characterized primarily in that the supporting frame is formed primarily by a supporting beam of torsion resistant profile tube while the seat or seats are adapted to be arranged on said supporting beam in such a way that the center of gravity on the seat or seats will be located above the supporting beam.

Thus, according to the present invention, a single supporting frame is utilized in the form of a supporting beam on which the various vehicle seats, line seat constructions as well as comfort seat constructions or intermediate solutions can be placed. Due to the unification and simplification of the supporting frame, high manufacturing costs and stock keeping costs are saved. If furthermore as a profile tube, a rectangular tube is utilized, not only a stabile torsion-resistant supporting construction is obtained but also the connecting elements for mounting the vehicle seats are greatly simplified.

Thus, with such rectangular tube, clamps may be utilized which embrace the profile tube at the top side thereof and at the two side surfaces and as the case may be, will also be compressible on the free legs. The compressing may be carried out in this connection by means of screws or for instance by means of an eccentric lever. If a plurality of connecting clamps are provided for a structural element, the eccentric levers may also be interconnected through the intervention of a shaft so that by a single handle the structural element can be loosened and may for instance be moved back and forth on the profile rail. If it is not desired to compress the clamp, the structural elements, for instance the seats, may be placed upon the supporting beam by means of said clamps. In this way, the structural elements can be mounted and dismounted in a minimum of time. In this instance it is suggested to provide the top side of the profile tube with a sound cushioning cover in order to dampen too high clattering noises which with this simple construction can frequently not be avoided.

For purposes of connection, also plates may be provided with a perforation therein which perforation in one direction is greater than the profile tube. It is furthermore suggested to arrange in said perforation two clamping wedges for engaging each other along their inclined surfaces and which are adapted to be pressed against each other by screws or eccentrics. It will be appreciated that with an arrangement of this type, when compressing both clamping parts, a pressure is exerted upon the bottom side as well as upon the top side of the profile tube whereby a safe anchoring and thus a safe and clatter-free holding of the structural elements on the supporting beam is assured. When the two parts are compressed by a screw, this screw may also at the same time form the axis for a pivotal support which will then be necessary if it is desired that one of the vehicle seats is pivotable toward the outside. For purposes of pivoting the vehicle seats toward the outside it is suggested according to the invention to divide the profile tube and to provide said profile tube at the parting line unilaterally with the telescopic tube section which is telescopically displaceable to a limited extent in the other profile tube section. In this way, the supporting beam and the profile tube can be extended to a limited extent and again can be pushed together. In this way, the distance between two adjacent seats can be varied in the described manner.

In order to avoid a clattering of the divided profile tube when the seat is empty, it is suggested according to the invention that in the pipe section cushioning blocks are pressed by spring force against the inner wall of the profile tube and advantageously in such a way that they will cushion a buckling-out movement between the two profile tube sections in upward direction and will support the buckling-out movement which is brought about by the weight of the seats.

For purposes of closing the end sides of the profile tubes, according to the invention displaceable and adjustable end sleeves are provided in the profile tube. These end sleeves may also be equipped with arm rests which in this way can be adjusted in conformity with the width of the seat surface.

Advantageously, one of the end sleeves is provided with connecting ears for mounting on the wall whereby the supporting beam according to the invention can be connected to the inner vehicle wall and on the other side merely a support is to be provided for supporting the supporting beam. In order to be able to arrange the supports of serially arranged vehicle seats precisely one behind the other in spite of an uneven or undulated vehicle wall, also these end sleeves are expediently displaceably and arrestably arranged in the profile tube. To this end, the end sleeve may have two oppositely located longitudinal slots which in a direction perpendicular to the slot plane defined by the two longitudinal slots is provided with a longitudinal oblong hole which can be slipped over a bore in the profile tube. Above the bore in the profile tube there is by means of a tongue provided a screw nut while by means of a screw bolt adapted to be screwed into the nut and resting against the other inner wall of the end sleeve, the end sleeve is adapted to be spread open and to be clamped fast. By tightening a single screw it is thus possible to locate the end sleeve and to arrest the same in such a way it will withstand not only the occurring forces but will also be surely in a clatter-free manner held in the profile tube. It is also possible to provide the end sleeve with longitudinal slots and to spread said end sleeve open by means of a clamping cone which is adapted by means of a screw bolt to be turned in from the end face, said clamping cone being adapted to be pulled into the end sleeve. This possibility is, of course, applicable only when the end sleeve is not used for mounting on the wall.

The vehicle seat construction according to the present invention thus points out a way how not only the manufacture can be simplified and thereby reduced in costs, but also teaches how with the same supporting frame construction this vehicle seat type may be employed. At the same time there is given the possibility by different standardized structural elements to compose seats in a building block manner so that even unskilled auxiliary labor can be used for manufacturing the seat according to the invention. As a result thereof it is also possible in case it should be necessary not to dispatch the seats in premounted condition to its respective destination. It is rather possible to disassemble the seat into parts because the assembly can be effected without difficulties on the spot so that considerable space and cost of transportation is saved.

Referring now to the drawings in detail, the vehicle seat construction shown in FIG. 1 has a profile tube which forms a supporting beam carried by two supports 2 and 3. By means of clamps or clips 4, two steel tube frames 5 are connected to teh profile tube 1 for building up a back for the vehicle seat. The side view shown in FIG. 2 concerns a seat cushion 6 to be placed upon the steel tube frame 5 and to be connected thereto. End units composed of sleeves 7 and tubular arm rest supporting members 8 are arranged on the polygonal profile tube 1 on both sides. The end sleeve 7 of each unit consists of a slotted tube section 9 which is insertable into the profile tube 1, and into which a clamping cone 11 can be pulled by means of a screw bolt 10. In this way it is possible to clamp the end sleeve 7 fast in any desired axial position in the profile tube 1.

Figure 4:
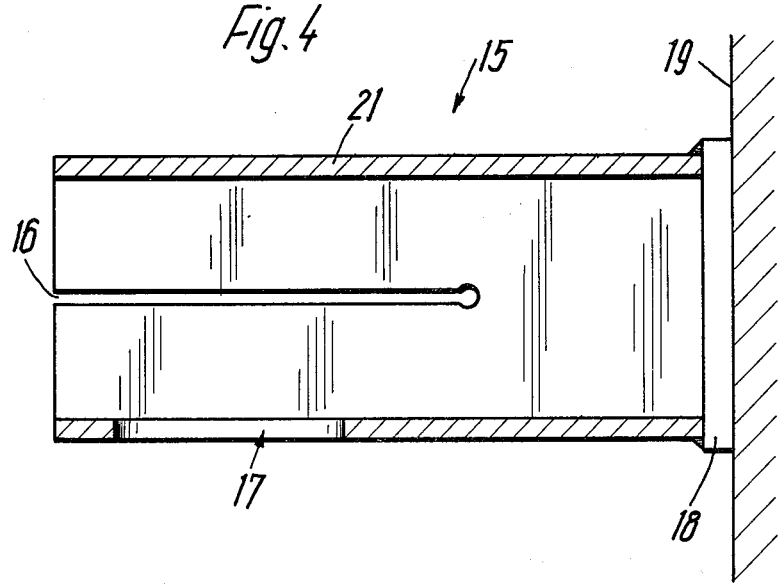

A further possibility of connecting such end sleeves in the profile tube 1 is illustrated in FIGS. 3, 4 and 5. The profile tube 1 has a bore 12 therethrough in the vicinity of the end face. Above the bore 12 by means of a cranked tongue 13 there is provided a nut 14. An end sleeve 15 has longitudinal slots 16 and in addition has an oblong hole 17. Provided at the end face are connecting ears 18 for connection to the vehicle inner wall 19. After the end sleeve 15 has been inserted into the profile tube 1, a screw bolt 20 is turned into the nut 14. In this way the longitudinal displacement of the end sleeve 15 to the length of the oblong hole 17 is limited. By tightening the screw bolt 20 the end face of this bolt presses upon the inner wall of the end sleeve 15 as well as the nut 14 and tongue 13.

As a result thereof, the tube 21 which forms the end sleeve 15 is spread open and thus is clamped fast in the profile tube 1.

Figure 7:
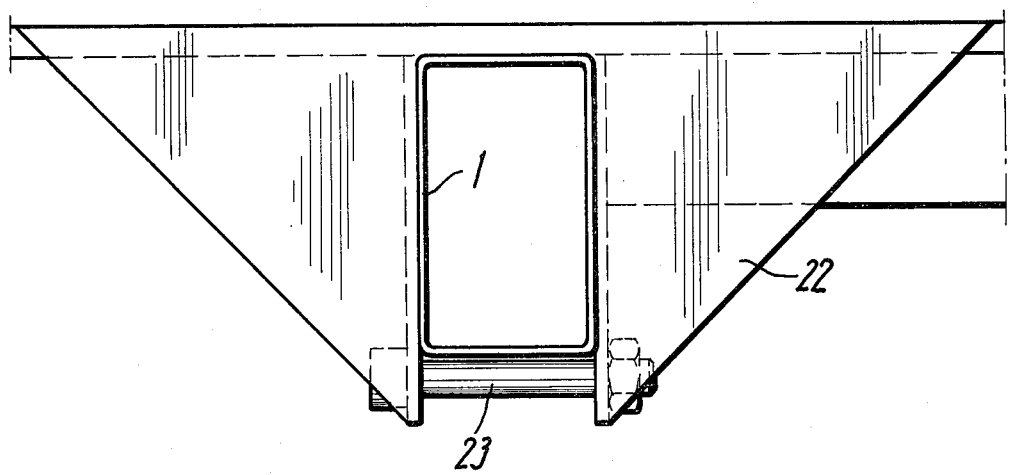
FIG. 7 is a view of a connecting clamp for use in connection with the present invention.
Figure 8:
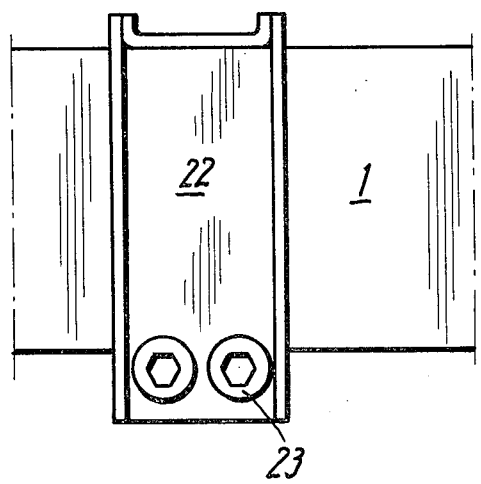
FIG. 8 shows a side view of the connecting clamp of FIG. 7.

For purposes of connecting the structural elements to the profile tube 1, clamps are provided as they are illustrated for instance in FIGS. 7 and 8. These clamps 22 embrace the profile tube 1 at the surface thereof and on the two lateral surfaces. On the free leg ends there are provided screws 23 which press the clamp against the vertical side walls of the profile tube 1 and thereby keep the same safely in its place. A further clamping possibility of the clamps 22 is illustrated in FIGS. 9 and 10. Provided on a screw bolt 24 is an eccentric lever 25, the eccentric 26 of which rests against the lateral surfaces of the clamp 22. By turning the eccentric lever, the screw bolt 24 is pulled toward the eccentric 26 so that the clamp 22 is pressed against the profile tube 1. In order to avoid a loosening of the eccentric, a helical spring 29 is provided between the pivots 27, 28. If two or more clamps are arranged on one structural element, the eccentric levers 25 may also be interconnected by shaft 30.

A further connecting possibility is illustrated in FIG. 11. According to this embodiment, the screw bolt 31 of a pivotable support 32 extends to two clamping wedges or keys 33, 34 which rest upon each other by their inclined surfaces. When tightening the screw bolt 31, the two clamping wedges 33 and 34 slide upon each other so that the clamping wedge 33 is pressed against the profile tube 1 whereas the clamping wedge 34 is pressed against the inner wall of a plate 35 embracing the profile tube 1. In this way, the profile tube 1 is safely pressed at its upper and lower side whereby a safe connection between the profile tube 1 and the plate 35 is effected.

Finallly, FIG. 12 illustrates a possibilitiy of dividing the profile tube 1 and to extend the same telescopically. A pipe section 36 is arranged on a profile tube part 1a. The pipe section 36 is adapted to be slipped into the profile tube 1b. In order to avoid a clattering when the seat is under no load, two springs 37 loaded damping or cushioning blocks 38 are provided in the pipe section 36 which latter rest against the inner wall of the profile part 1b. The arrangement of the blocks 38 is so selected that they aid the effect of the force acting through the weight of the seats in the direction of the arrow 39 so that the pipe section 36 will always safely engage or rest against the upper end face edge of the profile tube part 1b as well as rest against its lower end face edge.

It is, of course, to be understood that the present invention is, by no means, limited to the specific showing in the drawings, but also comprises any modifications within the scope of the appended claims.

What is claimed is:

1. A light seat construction, which comprises a support frame having a horizontal polygonal tubular member with opposite side walls in vertical planes, a plurality of seat means mounted on said polygonal torsion member with the central vertical plane through said polygonal torsion member passing through the center of said seat means, each seat means having a pair of connecting means fixed below said seat means in a central transverse vertical plane of said seat means, each of said connecting means being substantially an inverted U-shaped bracket member complementary to said polygonal torsion member and having its vertical sides closely fitting the vertical side walls of said polygonal torsion member and having clamping means below said polygonal torsion member clamping the sides of said connecting means against said polygonal torsion member, and an end unit comprising a tubular arm rest supporting member and a slotted tube section extending at right angles to said supporting member and into the end of said polygonal tubular torsion member, and a tapered member fitting into the slotted end of said tube section, a threaded clamping member extending from said arm rest supporting member through said tube section and engaging said tapered member for drawing said tapered member into said tube section to clamp said tube section to said polygonal torsion member.

2. A seat construction in combination according to claim 1 in which said tubular torsion member is a rectangular tube.

3. A seat construction according to claim 2 in which said frame engages said torsion member inwardly from the ends of the torsion member, and sleeve elements on the ends of the torsion member and adapted for being fixedly connected to the torsion member in adjusted positions.

4. A seat construction in combination according to claim 1 in which said clamping means comprises means connected between the free ends of said bracket members operable to draw the free ends of said bracket members together.

* * * * *